June 6, 1972   E. AGRATI ET AL   3,667,837
CINEMATOGRAPH PROJECTOR PARTICULARLY FOR SUBSTANDARD FILMS
Filed June 8, 1970   4 Sheets-Sheet 1

INVENTOR
EUGENIO AGRATI - ENNIO SALA
BY

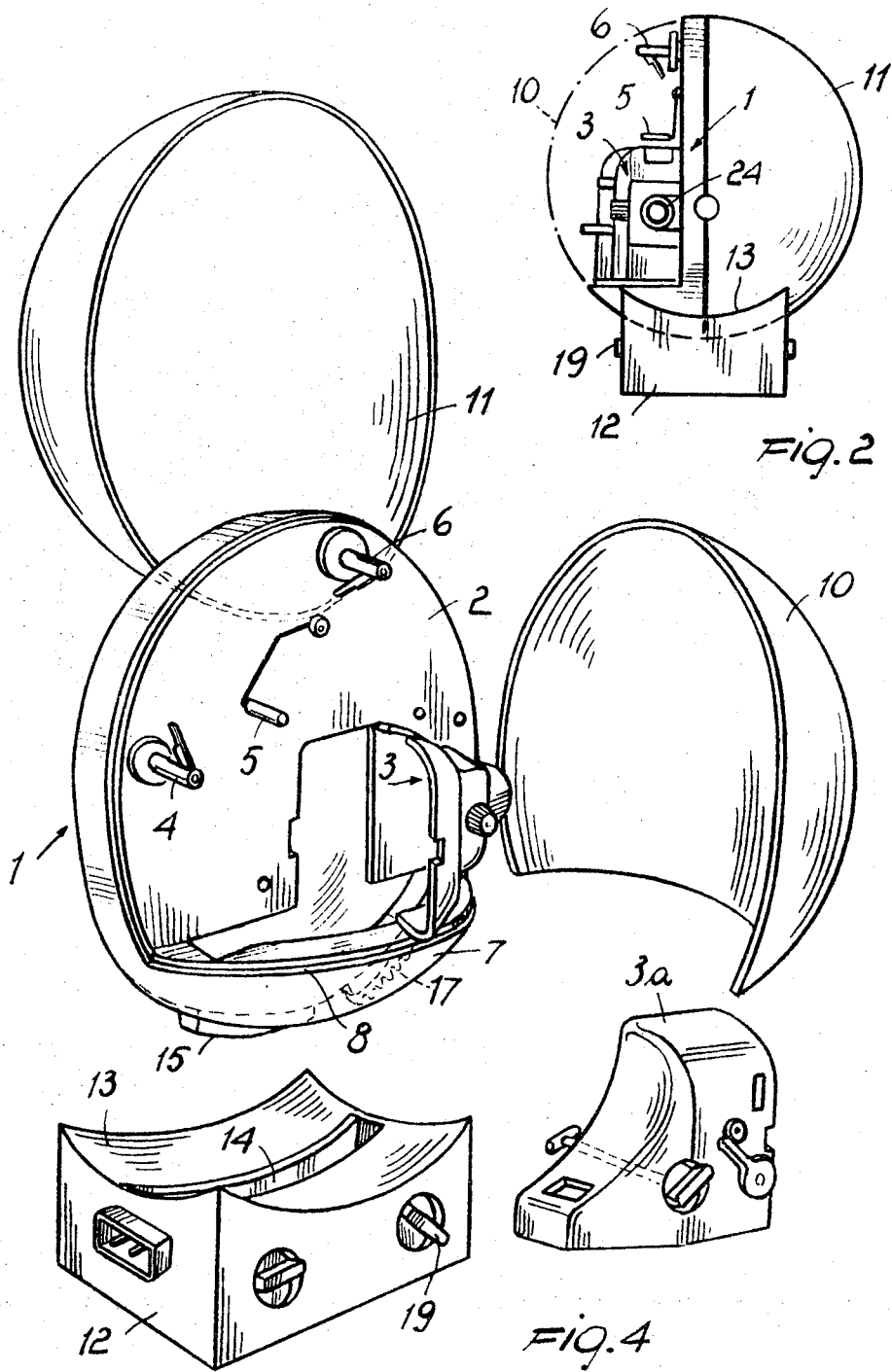

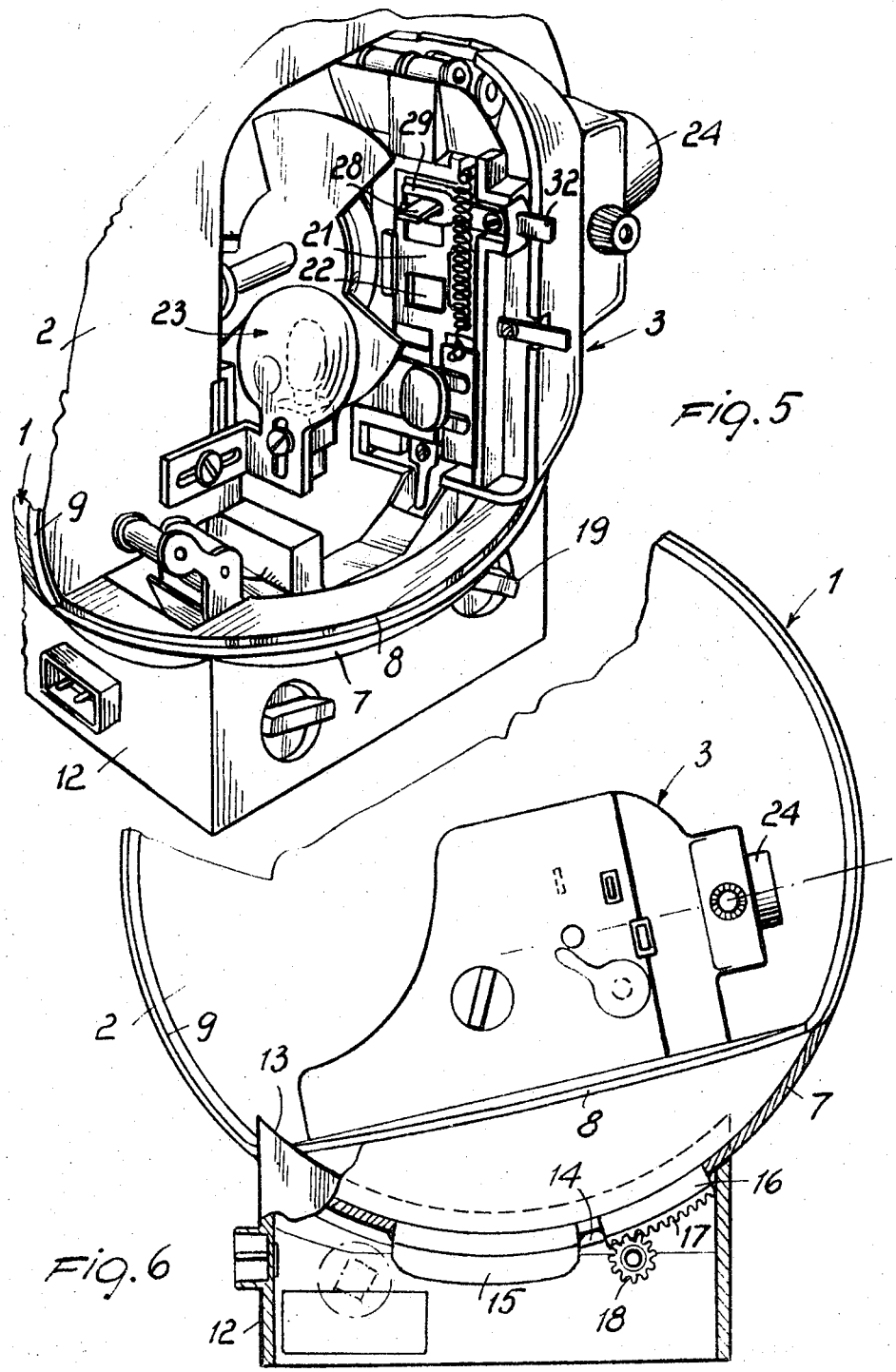

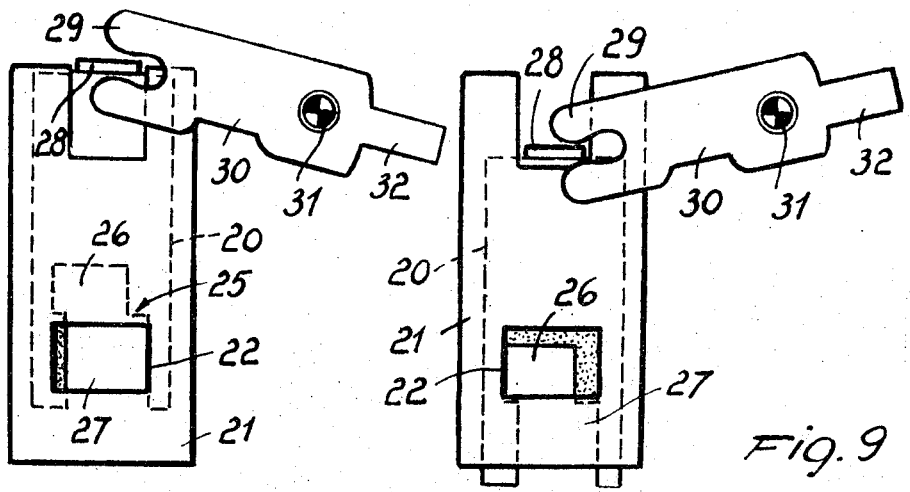
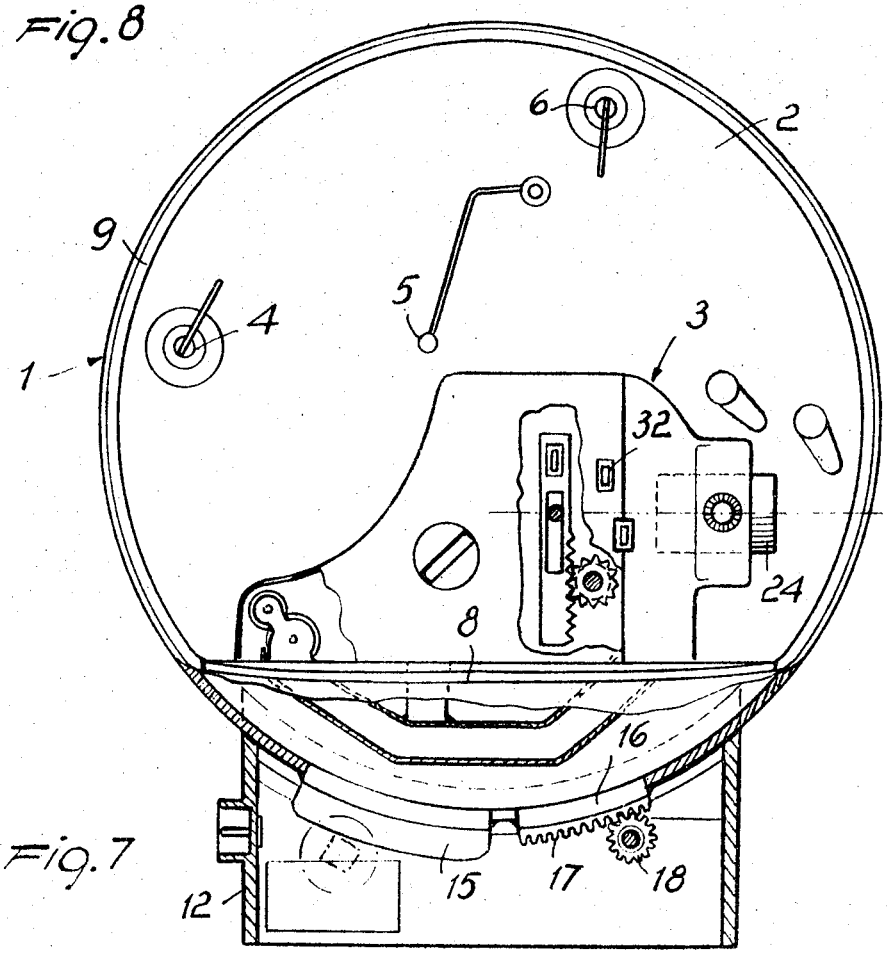

United States Patent Office 3,667,837
Patented June 6, 1972

3,667,837
CINEMATOGRAPH PROJECTOR PARTICULARLY FOR SUBSTANDARD FILMS
Eugenio Agrati, Via A. da Baggio 20/5, and Ennio Sala, Via A. da Baggio 20/13, both of Milan, Italy
Filed June 8, 1970, Ser. No. 44,223
Claims priority, application Italy, Oct. 10, 1969, 23,199/69
Int. Cl. G01n 21/14
U.S. Cl. 352—242                                     1 Claim

ABSTRACT OF THE DISCLOSURE

A cinematograph projector having a spherical upper casing slidably supported on a cradle-like support base and controlled by means of a rack and pinion arrangement.

BACKGROUND OF THE INVENTION

The present invention relates to a cinematograph projector particularly but not exclusively suitable for the projection of substandard films.

It is well known that in the construction of projectors of the type stated above it is necessary to take into account a certain number of requirements which are normally desired in such instruments, among which that of the stability of the projector during use is of considerable importance. It is further well known that many projectors for substandard films comprise in their structure means which permit the inclination of the projection beam to be varied, in order to satisfy other particular requirements of the user of the projector. Said means, which for example consist of a pair of feet of adjustable height attached to the front of the base of the projector give rise to the disadvantage of compromising the stability of the projector during its utilization, with consequent negative influence on the quality of the projection. This disadvantage, as can be easily understood, increases with time as a consequence of the inevitable formation of play between said means for adjusting the inclination of the luminous beam and the structure of the projector. It is further known that cinematograph projectors for substandard films of most recent construction are equipped for the projection of films of the so-called "eight" and "super eight" type. For this purpose an adaptor device is used in these projectors which interferes with the projection beam but which, although having the advantage of permitting the alternative projection of films of the type stated above, give rise to the not inconsiderable disadvantage of being of laborious manipulation, requiring the substitution of certain pieces of the structure of the projector by other additional pieces which form part of the projector outfit, and which requires the intervention of a skilled person in order to obtain good results, said pieces complicating the structure of the product and influencing in a not inconsiderable manner its cost.

SUMMARY OF THE INVENTION

The main object of the present invention is to provide a cinematograph projector particularly for substandard films, whose structure is capable of obviating and overcoming the disadvantages stated above, i.e. a cinematograph projector which while permitting the inclination of the projection beam at predetermined angles, guarantees considerable stability even after a prolonged period of use, without involving structural or functional complications of the projector nor requiring the use of devices of delicate and difficult construction.

A further object of the present invention is that of providing a cinematograph projector of the above stated type whose structure comprises the use of a device for the adaptation of the projector to films of the "eight" and "super eight" type, a device which, incorporated in the projector, can be easily manipulated even by unskilled persons in that it does not require the substitution of constituent parts of the projector nor the use of more or less complex mechanisms which might interfere with the results of the projection.

A further object of the present invention is that of providing a cinematograph projector of the type in question whose easy construction comprises the use of materials and structural components commercially available together with manufacturing operations of conventional type so as to be advantageous also from a strictly economical point of view.

According to the invention there is provided a cinematograph projector, particularly suitable for substandard films, according to the invention, in which the projector casing is lowerly provided with a foot substantially in the form of a spherical cap which marries with the concave face of a substantially cradle-like support base, said concave face defining at least one curvilinear guide with its curvature lying in a vertical plane and engaged with counter-guide members rigid with said foot substantially in the form of a spherical cap, said projector casing further including an adapting mask device arranged between the luminous source and the lens of said projector for the alternative projection of "eight" and "super eight" type films.

BRIEF DESCRIPTION OF THE DRAWINGS

The invention will better appear from the following detailed description of a preferred but not exclusive embodiment of a cinematograph projector particularly for substandard films according to the invention illustrated by way of example in the accompanying drawings in which:

FIG. 2 is a frontal view of a reduced scale of the projector of FIG. 1 in the operating position;

FIGS. 3 and 4 are perspective views on an enlarged scale of the cinematograph projector according to the invention with its constituent parts separated;

FIG. 5 is a partially sectional perspective view of the projector of the preceding figures;

FIGS. 6 and 7 are a partially sectional lateral view of a cinematograph projector according to the invention in two different operating positions;

FIGS. 8 and 9 are an enlarged view of a constructional detail of the structure of the cinematograph projector according to the invention.

DESCRIPTION OF THE PREFERRED EMBODIMENTS

Figure 1:
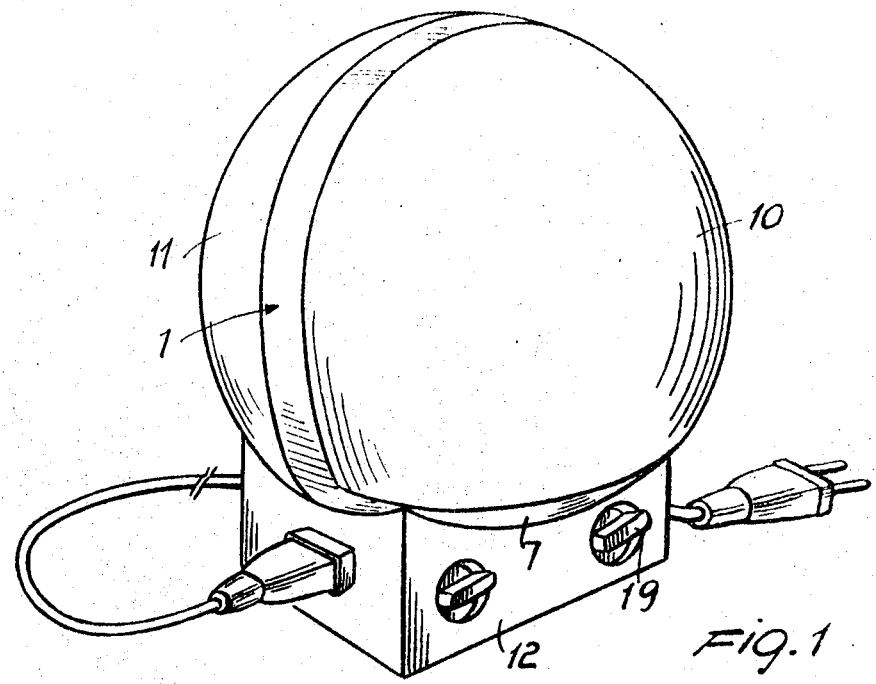
FIG. 1 is a perspective view of the cinematograph projector according to the invention in a non-operational condition.
Figure 3:
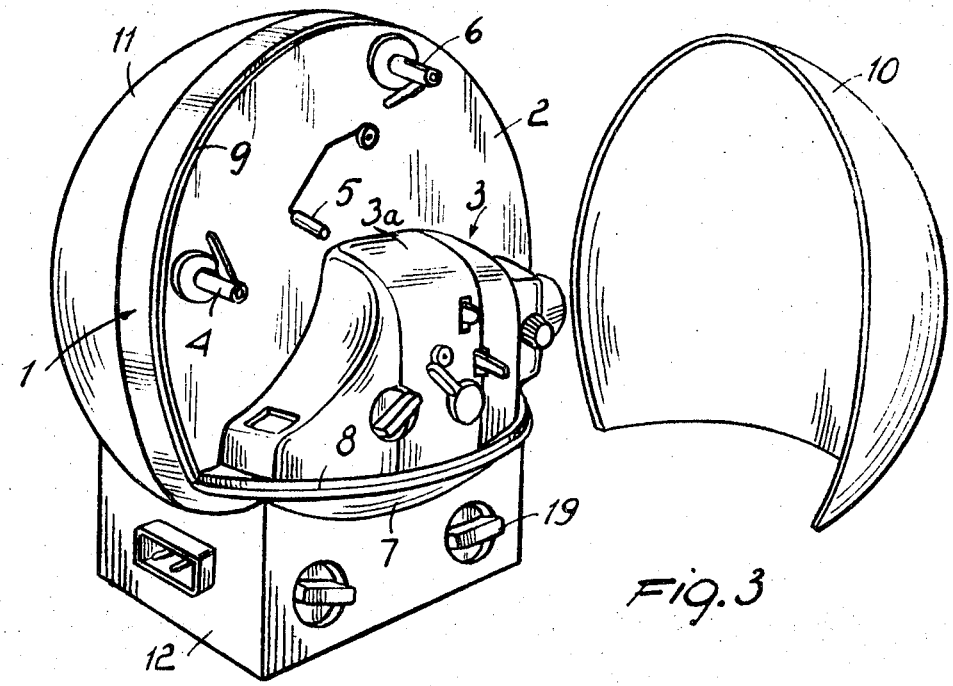

Referring to FIGS. 3 and 4, the cinematograph projector according to the invention particularly suitable for the projection of substandard cinematograph films, comprises a projector mounting plate-like member 1 in the form of a disc, disposed vertically, to whose face 2 are attached by conventional means a projector unit 3 with its corresponding housing 3a and essentially pivot members 4, 5 and 6 for the guide and drive of a film to be projected. Said disc member 1 supports on the face opposite the face 2 further mechanisms, not shown, for the operation of the projector unit 3 and movement of the film. Said disc member 2 is lowerly provided on the side of its face 2 with a lower base in form of a spherical semi-cap 7, which comprises a peripheral edge 8. The latter in co-operation with the edge 9 surrounding said face 2 is used for removably locking a substantially hemispherical shell envelope 10 which defines a cover and protection member for the projector unit 3 during non-operation of the projector. As visible from the drawings the radius of curvature of the lower base 7 is the same as that of the shell 10. A second hemispherical cap-like shell envelop 11 is joined to the peripheral edge surrounding the face of said disc opposite the face 2 previously described and is used as a cover and protection member for the mechanisms not shown, for the operation of the projector unit. The two envelopes 10 and 11 form, when mounted on the plate 2, a spherical projector casing (FIG. 1).

The projector according to the invention further comprises a support structure or base 12 consisting of an essentially box-like "cradle" member with its upper face 13 concave, the convavity facing upwards, and with a curvature which carries with the curvature of said spherical cap 7. Said concave face 13 is provided longitudinally with a through curvilinear window or slot 14, with its radius of curvature lying in a vertical plane. This through curvilinear window 14 constitutes a guide for a pair of curvilinear projections 15 and 16 provided on said disc member 1 below the semi-cap 7. Said projections 15 and 16, which are in an aligned arrangement, are of transversal dimensions substantially equal to the transversal dimensions of the through window 14 but their height is greater than the thickness of said concave face 13, in such a manner that said projections 15 and 16 project to a certain extend inside the box-like base member 12. While the projection 15 constitutes the actual guide member, the projections 16 is provided with a rack 17 which is engaged with a gear wheel 18 rotatably supported inside the box-like base 12 and made to rotate by means of the handle 19 accessible from the outside. As is easily seen in the figures of the accompanying drawings, the coupling between the plate-like disc member 1 supporting the projector device and the support base 12 situated below is practically a spherical coupling which is movable (oscillating) only in the direction defined by the guide 14 and the counter-guide members 15 and 16, the guide and counter guide being arranged in the direction of the luminous projection beam (luminous source-lens). The chosen and preferred position of the projector, namely the inclination of the projection beam, is obtained simply by turning the handle 19 so as to cause a rotation of the gear wheel 18 and hence a movement to a corresponding degree of the rack member 17. The large support surface of spherical type provided by the construction chosen for the support member of the projector is such as to guarantee against any type of vibration of this device during its operation even after a prolonged period of use.

The projector unit 3 according to the invention incorporates an adapting device for the projection alternatively of substandard films of the so-called "eight" and "super eight" type. This device (FIGS. 8 and 9) consists of a rectangular plate-like member 20, located behind the plate 21 with the window 22 and downstream of it with respect to the path of the luminous beam from the source 23 (FIG. 5) to the lens 24 of the projector. Said plate-like member 20 is provided lowerly, indicated by a broken line in FIG. 8, with a shaped through window 25 which upperly comprises a narrow zone 26 and lowerly a zone of greater dimensions 27. On the side opposite said window 25, the plate-like member 26 is provided with a square projection 28 which engages with the forked extremity 29 of a lever 30 pivoted at 31 to the fixed structure of the projector and defining a handle 32 projecting from the projector. By acting on said handle 32 the plate-like member 20 is lowered or raised so that it is made to coincide with the window 22 of the plates 21, in one case the narrow zone 26 and in the other case the zone of greater dimensions 27, according to whether the substandard films to be projected are of the "eight" type or "supper eight" type. These two positions of the plate-like member 20 are illustrated in FIGS. 8 and 9 of the accompanying drawings.

From the above description it may be seen that the projector according to the invention has considerable stability during operation, is of easy and practical adaptation to substandard films of different type and may be indicated according to the requirements of use.

What is claimed is:

1. A cinematograph projector particularly for substandard films, comprising a projector casing having two outer substantially hemispherical shell envelopes, a projector mounting plate defining means for receiving said hemispherical shell envelopes to form a substantially spherical projector casing and having a lower base with the shape of at least a portion of a spherical cap with the same radius of said hemispherical shell envelopes, and a support structure for said projector mounting plate and said lower base defining an upper portion with a concave shape for mating engagement with said lower base, wherein said upper portion of said support structure has a longitudinal slot extending in a direction parallel to the projection beam of the projector and said lower base has an elongated curvilinear projection provided for cooperation with said longitudinal slot, at least a portion of said projection being provided with a rack, said support structure further comprising a gear wheel rotatably supported by said support structure and engaging with said rack, and means for rotating said gear wheel.

References Cited

UNITED STATES PATENTS

| | | | |
|---|---|---|---|
| 2,594,404 | 4/1952 | Debrie | 352—243 |
| 1,794,726 | 3/1931 | Mitchell | 248—181 |
| 3,427,101 | 2/1969 | Jorgensen et al. | 352—79 |
| 2,371,435 | 3/1945 | Galorneau | 248—181 |
| 3,404,938 | 10/1968 | Kubnick et al. | 352—242 |

S. CLEMENT SWISHER, Primary Examiner

U.S. Cl. X.R.

352—79, 243